United States Patent
Blaylock et al.

(10) Patent No.: US 12,012,991 B1
(45) Date of Patent: **\*Jun. 18, 2024**

(54) CONCRETE VIBRATOR ADAPTER

(71) Applicant: TEMCo Industrial, LLC, Fremont, CA (US)

(72) Inventors: Bryan C. Blaylock, Fremont, CA (US); Josh L. Leber, Fremont, CA (US)

(73) Assignee: TEMCO INDUSTRIAL, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/384,102

(22) Filed: Oct. 26, 2023

Related U.S. Application Data

(63) Continuation of application No. 18/213,452, filed on Jun. 23, 2023.
(Continued)

(51) Int. Cl.
  *F16C 19/18* (2006.01)
  *F16C 33/60* (2006.01)
  *E04G 21/06* (2006.01)

(52) U.S. Cl.
  CPC .............. *F16C 19/18* (2013.01); *F16C 33/60* (2013.01); *E04G 21/06* (2013.01)

(58) Field of Classification Search
  CPC ..... B25F 3/00; B23B 45/003; B23B 51/0426; B23B 51/0473; B23B 2231/0204;
(Continued)

(56) References Cited

U.S. PATENT DOCUMENTS 2,596,335 A * 5/1952 Kessler ................. B24B 27/027
  464/53
3,724,561 A * 4/1973 Merrels .................... B25F 3/00
  74/665 Q
(Continued)

FOREIGN PATENT DOCUMENTS

BE        897725 A  *  1/1984  ............... B25F 3/00
CN    207063545 U  *  3/2018
(Continued)

OTHER PUBLICATIONS

Machine English translation of CN-207063545-U "Onodera" (Year: 2018).*
(Continued)

*Primary Examiner* — Jeffrey M Wollschlager
*Assistant Examiner* — Edgaredmanuel Troche
(74) *Attorney, Agent, or Firm* — Donald J. Ersler

(57) ABSTRACT

A concrete vibrator adapter preferably includes an adapter housing, a drive shaft and at least one rotary bearing. The adapter housing preferably includes a bearing bore formed in one end and a shaft hole formed through a bottom of the bearing bore. A ring thread is formed on an outer diameter of the adapter housing at a bore end to threadably receive a threaded retention ring of a vibrator cable. The drive shaft preferably includes a bearing portion, an input portion and an output portion. The bearing portion includes a first bearing diameter, a bearing flange and a second bearing diameter. The first bearing diameter receives a first bearing and the second bearing diameter receives a second bearing. The input portion extends outward from the second bearing diameter. The output portion extends outward from the first bearing diameter.

16 Claims, 3 Drawing Sheets

Related U.S. Application Data

(60) Provisional application No. 63/409,242, filed on Sep. 23, 2022.

(58) Field of Classification Search
CPC ......... B23B 31/11; B23B 49/04; B23B 51/12; B23B 51/123; B23B 51/126; B23B 51/14; E04G 21/06; E04G 21/063; E04G 21/08
USPC ................. 464/18, 161; 264/35, 69; 310/15; 366/64, 120, 128, 129, 343, 349; 173/46
See application file for complete search history.

(56) References Cited

U.S. PATENT DOCUMENTS

| | | | | |
|---|---|---|---|---|
| 5,330,206 | A * | 7/1994 | Krumszyn | ............ B25B 21/007 |
| | | | | 279/144 |
| 2005/0276156 | A1* | 12/2005 | Elsten | ................... E04G 21/065 |
| | | | | 366/117 |
| 2008/0253221 | A1* | 10/2008 | Lindley | ................. E04G 21/066 |
| | | | | 366/128 |
| 2010/0044063 | A1* | 2/2010 | Chen | ......................... B25F 3/00 |
| | | | | 173/205 |
| 2017/0218576 | A1* | 8/2017 | Lindley | ................. E01C 19/402 |

FOREIGN PATENT DOCUMENTS

| | | | | |
|---|---|---|---|---|
| FR | | 2534515 A * | 4/1984 | ................ B25F 3/00 |
| WO | WO-9746775 A1 * | 12/1997 | ............. E04G 21/08 |

OTHER PUBLICATIONS

Machine English translation of KR-200473088-Y1 "Lim Chang-yeol" (Year: 2014).*
Machine English translation of BE-897725-A "Bordet" (Year: 1984).*
Machine English translation of WO-9746775-A1 "Forest" (Year: 1997).*
Machine English translation of Bordet (FR-2534515-A) (Year: 1984).*

* cited by examiner

CONCRETE VIBRATOR ADAPTER

CROSS-REFERENCES TO RELATED APPLICATIONS

This is a continuation patent application which claims priority from non-provisional patent application Ser. No. 18/213,452, filed on Jun. 23, 2023, which claims the benefit of provisional patent application No. 63/409,242, filed on Sep. 23, 2022.

BACKGROUND OF THE INVENTION

Field of the Invention

The present invention relates generally to construction tools and more specifically to a concrete vibrator adapter, which allows a concrete vibrator cable to be driven by a rotary device.

Discussion of the Prior Art

It appears that the prior art does not teach or suggest a concrete vibrator adapter.

Accordingly, there is a clearly felt need in the art for a concrete vibrator adapter, which includes a first end that is inserted into a rotary device, such as a drill with a chuck and an opposing end which is secured to a drive end of a concrete vibrator cable.

SUMMARY OF THE INVENTION

The present invention provides a concrete vibrator adapter, which allows a concrete vibrator cable to be driven by a rotary device. The concrete vibrator adapter preferably includes an adapter housing, a drive shaft and at least one rotary bearing. The adapter housing preferably includes a bearing bore formed in one end and a shaft hole formed through a bottom of the bearing bore. A ring thread is formed on an outer diameter of the adapter housing at a bore end to threadably receive a threaded retention ring of a concrete vibrator cable. The drive shaft preferably includes a bearing portion, an input portion and an output portion. The bearing portion includes a first bearing diameter, a bearing flange and a second bearing diameter. The first bearing diameter is sized to receive a first bearing and the second bearing diameter is sized to a second bearing. The bearing is preferably a roller ball bearing, but other types of bearings may also be used. A bronze bushing or the like could also be used instead of the roller ball bearing.

The first bearing diameter extends axially outward from a first side of the bearing flange and the second bearing diameter extends axially outward from a second side of the bearing flange. The input portion extends outward from the second bearing diameter. The input portion preferably has a hex or square shaped outer perimeter to be received by a chuck of a drill. The output portion extends outward from the first bearing diameter. The output portion preferably has a hex or square shaped outer perimeter for insertion into a hex or square cavity in a drive end of a concrete vibrator cable. A maximum cross-sectional dimension of the hex or square perimeter must be less than a diameter of the first bearing diameter. Alternatively, the drive end of some vibrator cables include a hex or square male projection. Consequently, a length of the second bearing diameter would be extended and a hex or square cavity formed in an end of the extended second bearing diameter to receive the male hex or male square projection of the concrete vibrator cable.

Accordingly, it is an object of the present invention to provide a concrete vibrator adapter, which includes a first end that is retained in a rotary tool and an opposing end which is secured to a drive end of a concrete vibrator cable.

These and additional objects, advantages, features and benefits of the present invention will become apparent from the following specification.

DETAILED DESCRIPTION OF THE PREFERRED EMBODIMENTS

Figure 1:
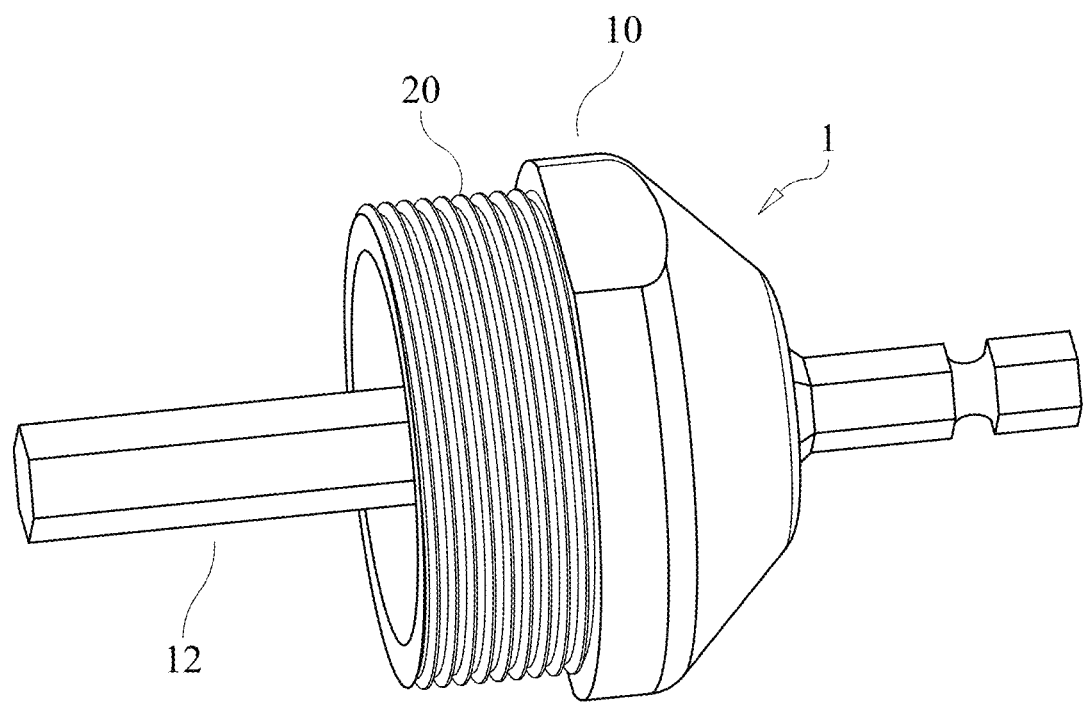
FIG. 1 is a perspective view of a concrete vibrator adapter in accordance with the present invention.
Figure 2:
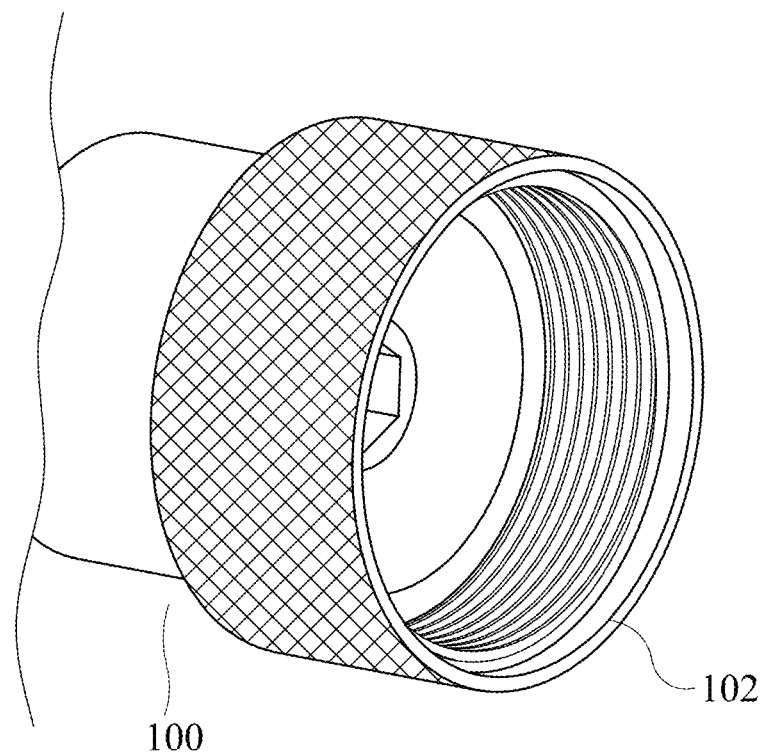
FIG. 2 is a perspective view of a drive end of a concrete vibrator cable, illustrating a threaded retention ring for attachment to a concrete vibrator adapter in accordance with the present invention.
Figure 3:
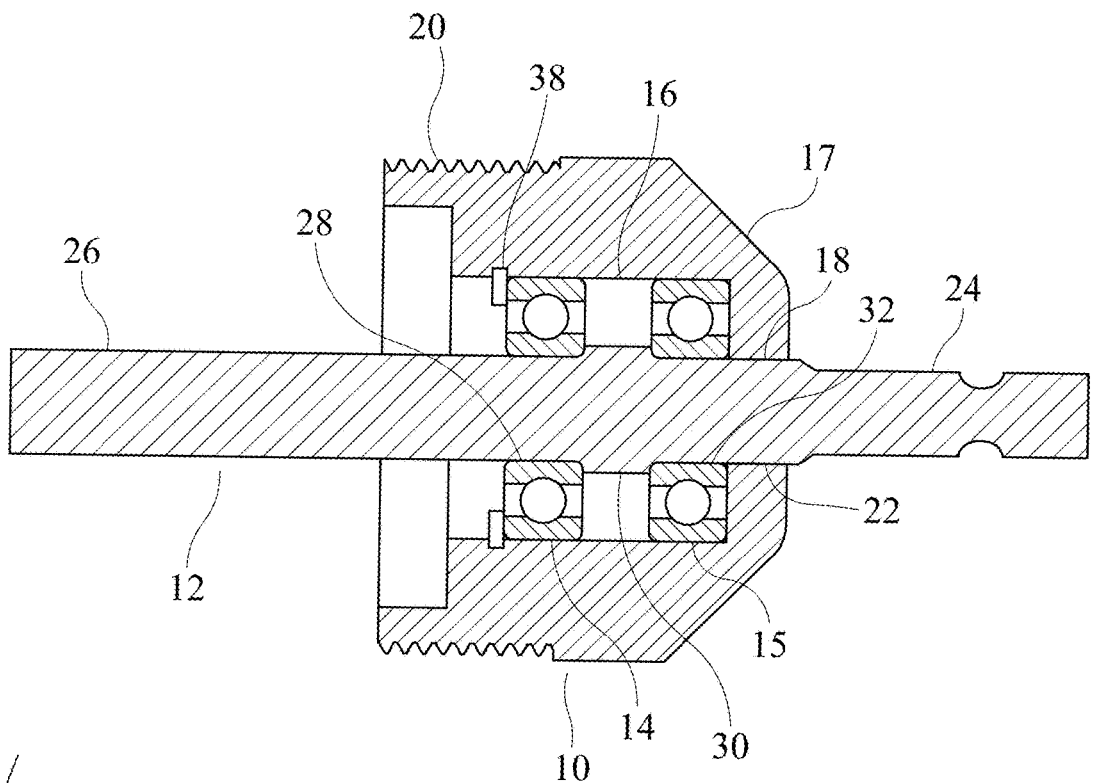
FIG. 3 is a cross sectional view of a concrete vibrator adapter in accordance with the present invention.

With reference now to the drawings, and particularly to FIG. 1, there is shown a perspective view of a concrete vibrator adapter 1. With reference to FIG. 3, the concrete vibrator adapter 1 preferably includes an adapter housing 10, a drive shaft 12 and at least one rotary bearing 14. The adapter housing 10 preferably includes a bearing bore 16 formed in one end and a shaft hole 18 formed through a bottom of the bearing bore 16. A chamfer 17 is preferably formed on an input end of the adapter housing 10. With reference to FIG. 2, a ring thread 20 is formed on an outer diameter of the adapter housing 10 at a bore end to threadably receive a threaded retention ring 102 of a vibrator cable 100. The drive shaft 12 preferably includes a bearing portion 22, an input portion 24 and an output portion 26. The bearing portion 22 includes a first bearing diameter 28, a bearing flange 30 and a second bearing diameter 32. The first bearing diameter 28 is sized to receive the first bearing 14 and the second bearing diameter 32 is sized to a second bearing 15. The first and second bearings 14, 15 are preferably roller ball bearings, but other types of bearings may also be used. A bronze bushing or the like could also be used instead of the roller ball bearing.

Figure 4:
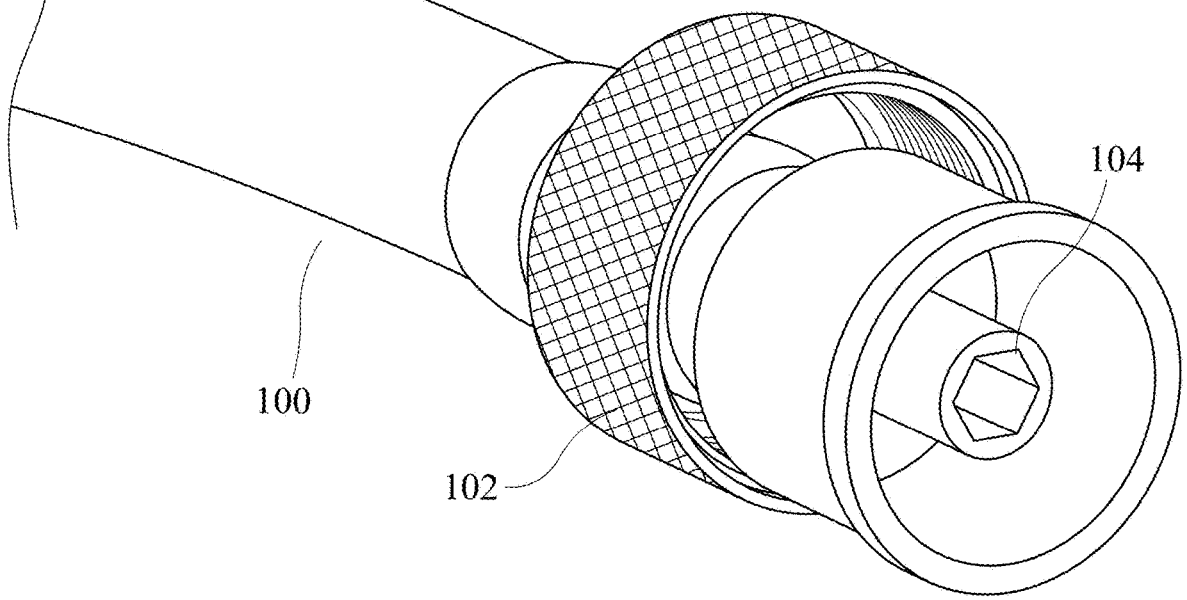
FIG. 4 is a perspective end view of a drive end of a concrete vibrator cable, illustrating a hex drive cavity for receiving an output portion of a concrete vibrator in accordance with the present invention.

The first bearing diameter 28 extends axially outward from a first side of the bearing flange 30 and the second bearing diameter 32 extends axially outward from a second side of the bearing flange 30. The input portion 24 extends axially outward from the second bearing diameter 26. The input portion 24 preferably has a hex shaped outer perimeter to be received by a chuck of a rotary device, such as a drill (not shown). The output portion 26 extends outward from the first bearing diameter 32. With reference to FIG. 4, the output portion 26 preferably has a hex or square shaped outer perimeter for insertion into a hex cavity 104 or square cavity in a drive end of the concrete vibrator cable 100. A maximum cross-sectional dimension of the hex or square perimeter of the output portion 26 must be less than a diameter of the first bearing diameter 28, such that the bearing 14 may be slipped over the output portion 26 and unto the first bearing diameter 28. A maximum cross-sectional dimension of the hex or square perimeter of the input portion 24 must be less than a diameter of the second bearing diameter 32, such that the bearing 14 may be slipped over the input portion 24 and unto the second bearing diameter 32.

Figure 5:
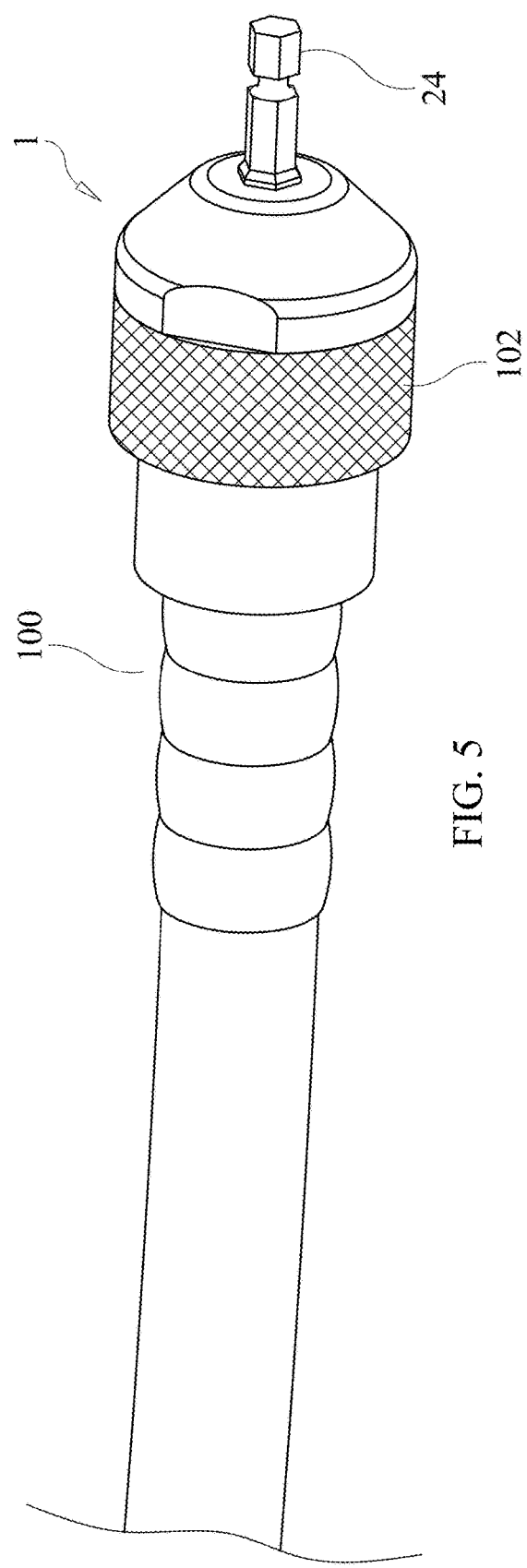
FIG. 5 is a perspective view of a concrete vibrator adapter assembled to a drive end of a concrete vibrator cable in accordance with the present invention.
Figure 6:
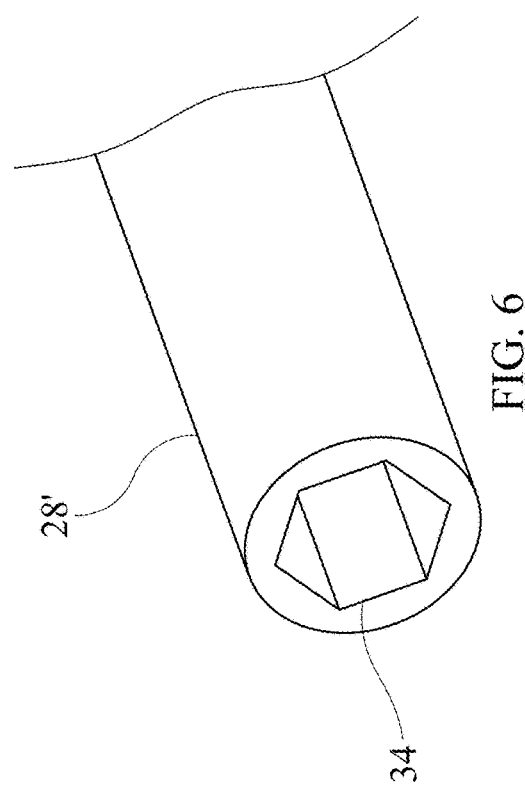
FIG. 6 is a perspective view of an extended first bearing diameter of a concrete vibrator adapter with a hex drive cavity for receiving a male projection of a concrete vibrator cable in accordance with the present invention.

Alternatively, with reference to FIG. 6, the drive end of some vibrator cables include a hex or square male projection. Consequently, a length of the second bearing diameter 28' is extended. A hex cavity 34 or square cavity is formed in an end of the extended second bearing diameter 28' to receive the male hex or square male projection of the concrete vibrator cable. The first bearing 14 is pushed on to the first bearing diameter 28 and the second bearing 15 is pushed on to the second bearing diameter 32. The drive shaft 12, the first rotary bearing 14 and the second rotary bearing 15 are inserted into the bearing bore 16. A ring slot is formed on the inside of bearing bore 16 to receive a snap ring 38. The snap ring 38 axially retains the drive shaft 12 in the adapter housing 10. With reference to FIG. 5, the threaded retention ring 102 of the vibration cable is threaded onto the ring thread 20 of the concrete vibration adapter 1.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A concrete vibrator adapter for driving a concrete vibrator cable, the concrete vibrator cable having a cable drive shaft with a cable female drive cavity and a cable retention ring having internal threads, the concrete vibrator adapter is driven with a hand held powered rotary device having a chuck, comprising:
    an adapter housing, said adapter housing includes a bearing bore formed in one end and a shaft hole formed through a bottom of said bearing bore, a ring thread is formed around said adapter housing at a bearing bore end;
    at least one of a bushing or a bearing; and
    a drive shaft includes an input end and an output end, said drive shaft is inserted through said at least one of a bushing or a bearing, said at least one of a bushing or a bearing is retained in said bearing bore, said input end extends through said shaft hole, wherein said input end is retained in the chuck of the hand held powered rotary device, said output end is retained in the cable female drive cavity of the cable drive shaft, the cable retention ring having internal threads is threaded on to said ring thread.

2. The concrete vibrator adapter of claim 1 wherein:
    a chamfer is formed on said input end of said adapter housing.

3. The concrete vibrator adapter of claim 2, further comprising:
    said first bearing diameter is sized to receive a first bearing or bushing, said second bearing diameter is sized to receive a second bearing or bushing.

4. The concrete vibrator adapter of claim 1 wherein:
    said drive shaft includes a bearing portion formed between said input end and said output end, said bearing portion includes a first bearing diameter, a bearing flange and a second bearing diameter.

5. The concrete vibrator adapter of claim 1, further comprising:
    a ring groove is formed at an entrance to said bearing bore, said ring groove is sized to receive a snap ring to retain said at least one of a bushing or a bearing.

6. A concrete vibrator adapter for driving a concrete vibrator cable, the concrete vibrator cable having a cable drive shaft with a cable female drive cavity and a cable retention ring having internal threads, the concrete vibrator adapter is driven with a hand held powered rotary device having a chuck, comprising:
    an adapter housing, said adapter housing includes a bearing bore formed in one end and a shaft hole formed through a bottom of said bearing bore, a ring thread is formed around said adapter housing at a bearing bore end;
    at least one of a bushing or a bearing;
    a bearing retention ring;
    a drive shaft includes an input end and an output end, said drive shaft is inserted through said at least one of a bushing or a bearing, said at least one of a bushing or a bearing is retained in said bearing bore, said input end extends through said shaft hole, wherein said input end is retained in the chuck of the hand held powered rotary device, said output end is retained in the cable female drive cavity of the cable drive shaft, the cable retention ring having internal threads is threaded on to said ring thread, said bearing retention ring retains said at least one of a bushing or a bearing in said bearing bore.

7. The concrete vibrator adapter of claim 6 wherein:
    a chamfer is formed on said input end of said adapter housing.

8. The concrete vibrator adapter of claim 6 wherein:
    said drive shaft includes a bearing portion formed between said input end and said output end, said bearing portion includes a first bearing diameter, a bearing flange and a second bearing diameter.

9. The concrete vibrator adapter of claim 8, further comprising:
    said first bearing diameter is sized to receive a first bearing or bushing, said second bearing diameter is sized to receive a second bearing or bushing.

10. The concrete vibrator adapter of claim 6, further comprising:
    a ring groove is formed at an entrance to said bearing bore, said ring groove is sized to receive a snap ring to retain said at least one of a bushing or a bearing.

11. The concrete vibrator adapter of claim 6 wherein:
    a drive cavity is formed in said output end to receive a male projection of a concrete vibrator.

12. A combination of a concrete vibrator adapter and a concrete vibrator cable, the concrete vibrator adapter is driven by a hand held powered rotary device having a chuck, comprising:
    an adapter housing, said adapter housing includes a bearing bore formed in one end and a shaft hole formed through a bottom of said bearing bore, a ring thread is formed around said adapter housing at a bearing bore end;
    said concrete vibrator cable having a cable drive shaft with a cable female drive cavity and a cable retention ring having internal threads;

at least one of a bushing or a bearing; and
a drive shaft includes an input end and an output end, said drive shaft is inserted through said at least one of a bushing or a bearing, said at least one of a bushing or a bearing is retained in said bearing bore, said input end extends through said shaft hole, wherein said input end is retained in the chuck of the hand held powered rotary device, said output end is retained in the cable female drive cavity of the cable drive shaft, said cable retention ring having internal threads is threaded on to said ring thread.

13. The combination of a concrete vibrator adapter and a concrete vibrator cable of claim 12 wherein:
a chamfer is formed on said input end of said adapter housing.

14. The combination of a concrete vibrator adapter and a concrete vibrator cable of claim 12 wherein:
said drive shaft includes a bearing portion formed between said input end and said output end, said bearing portion includes a first bearing diameter, a bearing flange and a second bearing diameter.

15. The combination of a concrete vibrator adapter and a concrete vibrator cable of claim 12 wherein:
said first bearing diameter is sized to receive a first bearing or bushing, said second bearing diameter is sized to receive a second bearing or bushing.

16. The combination of a concrete vibrator adapter and a concrete vibrator cable of claim 12, further comprising:
a ring groove is formed at an entrance to said bearing bore, said ring groove is sized to receive a snap ring to retain said at least one of a bushing or a bearing.

\* \* \* \* \*